(12) United States Patent
Kram

(10) Patent No.: US 8,395,475 B2
(45) Date of Patent: Mar. 12, 2013

(54) BEARING DEVICE HAVING POSITION INDICATOR

(75) Inventor: Martin Kram, Gerolzhofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 176 days.

(21) Appl. No.: 12/995,088

(22) PCT Filed: May 26, 2009

(86) PCT No.: PCT/DE2009/000749
§ 371 (c)(1),
(2), (4) Date: Nov. 29, 2010

(87) PCT Pub. No.: WO2009/143830
PCT Pub. Date: Dec. 3, 2009

(65) Prior Publication Data
US 2011/0095861 A1    Apr. 28, 2011

(30) Foreign Application Priority Data
May 30, 2008  (DE) .......................... 10 2008 026 081

(51) Int. Cl.
*H01C 10/32* (2006.01)
(52) U.S. Cl. ..................... 338/162; 338/174; 338/160
(58) Field of Classification Search ............ 338/174, 338/175
See application file for complete search history.

(56) References Cited

U.S. PATENT DOCUMENTS

| | | | | |
|---|---|---|---|---|
| 2,880,293 A | * | 3/1959 | Blanco .......................... | 338/164 |
| 2,926,321 A | * | 2/1960 | Stein et al. ..................... | 338/137 |
| 3,445,802 A | * | 5/1969 | Spaude ......................... | 338/167 |
| 5,952,912 A | * | 9/1999 | Bauer et al. .................. | 338/162 |

FOREIGN PATENT DOCUMENTS

| | | |
|---|---|---|
| DE | 20316544 | 3/2005 |
| DE | 102005007776 | 8/2006 |
| DE | 102008008727 | 8/2009 |
| JP | 08312642 A | 11/1996 |
| JP | 2004308724 | 11/2004 |
| JP | 2006029517 A | 2/2006 |

* cited by examiner

*Primary Examiner* — Kyung Lee
(74) *Attorney, Agent, or Firm* — Lucas & Mercanti, LLP; Klaus P. Stoffel

(57) ABSTRACT

The invention relates to a bearing device having a position indicator, comprising a bearing receptacle (2) and a bearing (3) disposed in the bearing receptacle (2) having a first bearing part (4) displaceable relative to the bearing receptacle (2), wherein the position indicator (6) comprises a potentiometer having a resistor circuit (8) and a position finger (7). The aim of providing a bearing device having a position indicator allowing reliable capture of the relative position of the bearing in the bearing device and capture of the position of the bearing parts of the bearing to each other in a simple manner is achieved according to the invention in that the resistor circuit (8) is associated with the bearing receptacle (2) and first bearing part, and that the position finger (7) is associated with the bearing receptacle and first bearing part (4).

6 Claims, 1 Drawing Sheet

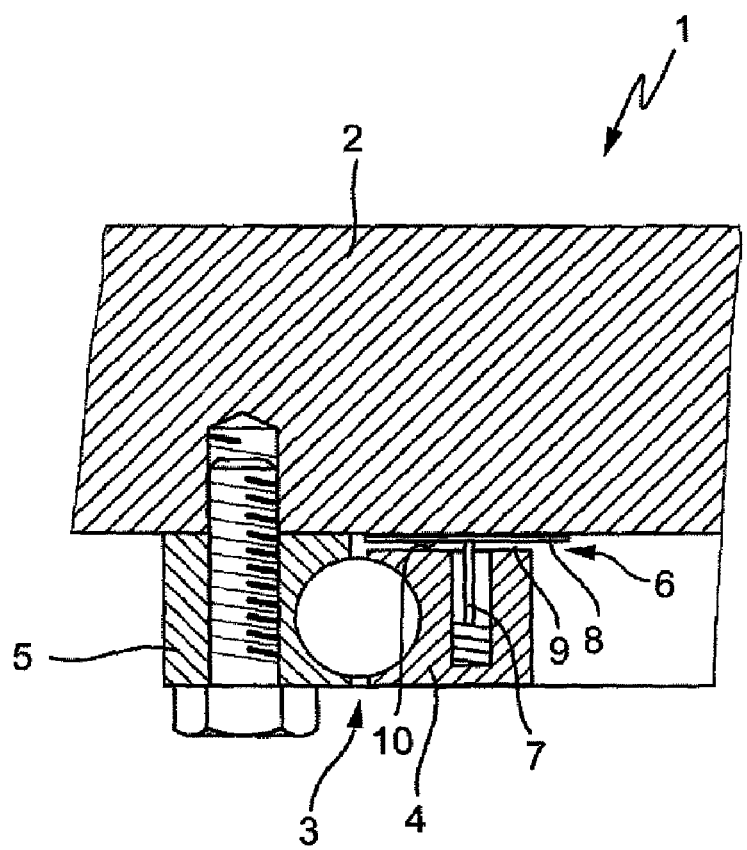

BEARING DEVICE HAVING POSITION INDICATOR

This application claims the priority both of DE 10 2008 026 081.9, filed May 30, 2008, and PCT/DE2009/000749, filed May 26, 2009, both of which are incorporated by reference herein.

FIELD OF THE INVENTION

The invention relates to a bearing device according to the preamble of claim 1 having a position indicator.

From practical experience it is known to sense the position of the two bearing rings or bearing parts of a bearing relative to one another. For example, in the case of a rotational bearing with two bearing rings, one of the two bearing rings can be assigned a circumferential magnetic code, and the other of the two bearing rings can be assigned a magnetic sensor which senses the change in the magnetic field of the magnetic code during the relative movement of the two bearing rings with respect to one another and supplies a digital output signal. The relative position of the two bearing rings with respect to one another can be calculated from this digital output signal only with a large amount of expenditure; inaccuracies also occur in the spatial resolution owing to the digitization of the signal.

JP 2004308724 AA (Abstract) describes a rotational roller bearing with a rotational sensor, wherein, in addition to the two bearing parts which are embodied as bearing rings, a magnetic code is provided on a roller body cage, said magnetic code changing its magnetization in the circumferential direction. Arranged opposite the magnetic code is a magnetic sensor which supplies an output signal which is analogous with the absolute position of the two bearing rings. Such a position indicator is complex in design, requires electronic post-processing of the signal and provides only a small spatial resolution. Furthermore, existing bearings, in particular roller bearings, cannot be readily retrofitted.

DE 203 16 544 U1 describes a rotational roller bearing with a monitoring device with a sensor which senses the relative movement of the two bearing parts which are embodied as bearing rings of the roller bearing. The sensor, which is not described in more detail, is embodied as a displacement-measuring sensor which operates in a contactless fashion.

JP 2006029517 AA (Abstract) describes a rotational roller bearing with two bearing parts which are embodied as bearing rings, and a rotational sensor which senses the relative rotation of the two bearing rings with respect to one another. The rotational sensor determines an eddy current at the surface of one of the two bearing rings, which eddy current is caused by a magnetic structure as soon as the two bearing rings rotate with respect to one another, said magnetic structure surrounding the other of the two bearing rings and being formed eccentrically with respect to the rotational axis. Absolute position measurement with an analog output signal is not possible in this way.

The application DE 10 2008 008 727.0, applied for on 12 Feb. 2008, after the publication date of the present document, describes bearings comprising a first bearing part, a second bearing part which can move relative to the first bearing part and a position indicator which supplies an analog signal corresponding to the relative position of the two bearing parts, wherein the position indicator comprises a potentiometer which has a resistor track and a position finger, wherein the resistor track is connected in a rotationally fixed fashion to the first bearing part, and the position finger is connected in a rotationally fixed fashion to the second bearing part.

The abovementioned publications and the abovementioned application which was published after the priority date of the present document each describe two-part bearings, wherein a structural modification, in order to form the position indicator, is provided on each of the two bearing parts.

DE 10 2005 007 776 A1 describes a bearing device having a bearing receptacle in which a bearing is held, wherein the bearing is embodied as a rotational bearing with two bearing rings, wherein three measured value pickups, not described in more detail, for determining the position of the bearing ring with respect to the bearing receptacle are arranged on the fixed bearing ring of the two bearing rings. The measured value pickups are arranged in this case at spatial distances from one another along the circumference of the bearing ring and they sense the position of the bearing ring with respect to the bearing receptacle only at three points along the circumference of the bearing ring. The output values of the measured value pickups serve to re-adjust the position of the bearing in the bearing receptacle.

OBJECT OF THE INVENTION

The object of the invention is to specify a bearing device having a position indicator, which bearing device easily permits reliable sensing of the relative position of the bearing in the bearing device and sensing of the position of the bearing parts of the bearing with respect to one another.

SUMMARY OF THE INVENTION

This object is achieved according to the invention by means of a bearing device according to claim 1.

Insofar as an explanation is given below of the invention on the basis of bearing rings as components of a rotational bearing, it is to be understood that the invention also relates to bearing parts of a linear bearing, and the description is to be appropriately transferred to linear bearings.

The position indicator here has a potentiometer whose components, a position finger and a conductor track, are connected to the two bearing rings in a rotationally fixed fashion so that a change in the relative position of the two bearing rings with respect to one another brings about a change in the electrical properties of the potentiometer. If the potentiometer is considered to be a voltage divider, a specific voltage value corresponds to each position of the bearing rings with respect to one another, specifically also to each rotational angle which the two bearing rings form with one another. Further characteristic variables such as the rotational speed, acceleration, rotational direction (in rotational bearings) or the travel covered or the direction (in linear bearings), which are characteristic of the operation of the bearing, can easily be derived insofar as the position of the bearing rings is sensed at various times.

A specific section of the potentiometer, for example one of the end points thereof, can be defined in that on the first bearing ring a position is indicated which permits absolute determination of the position, in particular if the first bearing ring is arranged in a fixed fashion with respect to a bearing receptacle which holds the entirety of the bearing.

The arrangement of the position finger on the part of the bearing which is fixed with respect to the first bearing part, and of the resistor track on the bearing receptacle makes it possible, given a two-part or multi-part bearing, to modify just one of the bearing parts so that further bearing parts of the bearing do not need to be reconstructed. The same also applies to a situation in which the position finger is arranged on the bearing receptacle and the resistor track is arranged on the first bearing part. In both cases it is possible to sense the position of the first bearing part both relative to the other parts of the bearing and relative to the bearing receptacle, in particular if the bearing preferably comprises a second bearing part which is arranged in a fixed fashion on the bearing receptacle.

There is preferably provision that the potentiometer is embodied as a film potentiometer. Film potentiometers are small in design and have a thickness of typically less than approximately 0.5 mm so that they can also be attached to curved surfaces, such as to the inner lateral surface of an outer bearing ring of a bearing. Film potentiometers are very robust and reliable in operation and already existing roller bearings or sliding bearings can also easily be retrofitted with film potentiometers. The contact between the spaced-apart conductor tracks of the film potentiometer can be closed in a mechanical fashion by pressing the conductor tracks against one another; however, magnetic film sensors can, of course, also be provided.

There is preferably provision that the bearing is embodied as a roller bearing or slider bearing, wherein the first bearing part is embodied as a first bearing ring, and the second bearing part is embodied as a second bearing ring. In this case, the bearing carries out, in particular, a rotational movement so that the position finger is guided in a plane at its end.

If the bearing has a bearing ring, there is preferably provision that the position finger is arranged perpendicularly with respect to an end face of the first bearing ring. The position finger here can span a gap which is arranged between the end face of the first bearing ring and the bearing receptacle and which is inserted into the bearing receptacle when the bearing is mounted. Furthermore, the position finger can be arranged on the end face of the bearing ring without having to make significant structural changes to the first bearing ring; in particular, the position finger and the resistor track can also be retrofitted.

Further advantages and features of the invention can be found in the dependent claims and in the description of an exemplary embodiment.

The invention will be described and explained in more detail below with reference to the appended drawing.

BRIEF DESCRIPTION OF THE DRAWINGS

FIG. 1 is a schematic view of a cross section through an exemplary embodiment of a bearing device according to the invention.

DETAILED DESCRIPTION OF THE DRAWING

FIG. 1 shows a bearing device 1, comprising a bearing receptacle 2 and a bearing 3, which is embodied as a roller bearing. The bearing 3 comprises two bearing parts, specifically a first bearing part 4, embodied as an inner ring, and a second bearing part 5, embodied as an outer ring. The second bearing part 5 is fixedly arranged on the bearing receptacle 2 by means of a screw, while the first bearing part 4 is arranged in a movable, in particular rotatable, fashion with respect to the second bearing part 5 and the bearing receptacle 2.

The bearing device 1 also comprises a position indicator 6, which permits the position of the first bearing part 4 to be sensed relative to the bearing receptacle 2 and relative to the second bearing part 5 as an analog signal. The position indicator 6 is embodied as a potentiometer and comprises a position finger 7 and a resistor track 8. The position finger 7 is arranged in a fixed fashion on the first bearing part 4. The resistor track 8 is attached to the bearing receptacle 2. The resistor track 8 is separated from an end face 10 of the first bearing part 4 by means of a gap 9. This gap 9 is spanned by the position finger 7 in such a way that contact is produced in the resistor track 8 and an electrical signal—which is dependent on the position of the position finger 7 relative to the bearing receptacle 2 or to the second bearing part 5—can be tapped, for example as a voltage. In particular, the potentiometer is embodied as a film potentiometer, with an embodiment either as an electrical film potentiometer or as a magnetic film potentiometer being suitable.

The first bearing part 4, embodied as an inner ring of the roller bearing 3, accommodates an end section of a shaft (not illustrated in more detail), which end section is mounted on the bearing position 2.

The position finger 7 is accommodated in the body of the first bearing part 4 and protrudes beyond the end face 10. Of course, in an alternative exemplary embodiment the position finger 7 can also be arranged on the outer face of the body of the first bearing part 4; it is also possible to provide that the position finger 7 is arranged on the outer lateral face of the first bearing part 4.

The invention has been described above with reference to an exemplary embodiment in which the bearing 3 was embodied as a roller bearing. Of course, the invention can also be provided for other types of bearing, for example for sliding bearings, articulated bearings or linear guides.

In the exemplary embodiment described above, there was provision that the position finger 7 was arranged on the first bearing part 4, and the resistor track 8 was arranged on the bearing receptacle 2. Of course, the position finger 7 can also be arranged on the bearing receptacle 2, and the resistor track 8 can be arranged on the first bearing part 4.

In the exemplary embodiment described above, the position finger 7 essentially describes, on the resistor track 8, a circular path or circular segment path at an approximately constant distance from the axis of the bearing 3. The position of the position finger 7, and therefore of the first bearing 4 relative to the bearing receptacle 2, corresponds here to the length of the circular segment. Of course, the position finger 7 can also be at a radially changing distance from the rotational axis. In particular, it is not absolutely necessary for the resistor track 8 to be at a fixed distance from the rotational axis of the bearing 3. Although it is specifically possible to provide that the resistor track 8 is embodied in the shape of a circle or circular segment, the center point of the circle of the resistor track 8 is at a distance from the rotational axis of the bearing 3. If the first bearing 3 moves relative to the bearing receptacle 2, the position finger 7 experiences displacement not only in the circumferential direction of the resistor track 8 but also in the radial direction. In this way, it is possible to determine the position of the position finger 7 by means of two different measurement variables, wherein the two measurement variables can be used for mutual checking or calibration.

In the exemplary embodiment described above, the resistor track 8 was essentially parallel to the end face 10 of the first bearing part 4, and therefore of essentially planar design. Of course, the resistor track 8 can also be of curved design in the axial direction in order to be able to sense tipping of the first bearing part 4 relative to the second bearing part 5 or to the bearing receptacle 2. In addition, the radial extent of the resistor track 8 does not, of course, need to correspond to the radial extent of the end face 10 of the first bearing 4. If necessary, the resistor track 8 can be made narrow compared to the radial extent of the end face 10 of the first bearing part 4.

LIST OF REFERENCE NUMERALS

1 Bearing device
2 Bearing receptacle

3 Bearing
4 First bearing part
5 Second bearing part
6 Position indicator
7 Position finger
8 Resistor track
9 Gap
10 End face

The invention claimed is:

1. A bearing device having a position indicator, comprising:
 a bearing receptacle; and
 a bearing which is arranged in the bearing receptacle and has a first bearing part movable relative to the bearing receptacle and a second bearing part fixed onto a surface of the bearing receptacle, wherein one of the first and second bearing parts is an inner ring and the other of the first and second bearing parts is an outer ring, the surface of the bearing receptacle facing an end face of the first bearing part,
 wherein the position indicator comprises a potentiometer with a resistor track and a position finger, and wherein the resistor track is assigned to either the surface of the bearing receptacle or the end face of the first bearing part, and in that the position finger is assigned to the opposing one of the bearing receptacle and first bearing part.

2. The bearing device as claimed in claim 1, wherein the potentiometer is a film potentiometer.

3. The bearing device as claimed in claim 1, wherein the bearing is a roller bearing.

4. The bearing device as claimed in claim 3, wherein the position finger is arranged perpendicularly with respect to an end face of the first bearing ring.

5. The use of a film potentiometer in a bearing arrangement as claimed in claim 1 as a potentiometer with an analog output signal.

6. The bearing device as claimed in claim 1, wherein a gap is present between the resistor track and the opposing one of the bearing receptacle and first bearing part, and the position finger spans the gap.

* * * * *